(12) United States Patent
Zou et al.

(10) Patent No.: US 11,219,033 B2
(45) Date of Patent: Jan. 4, 2022

(54) INTELLIGENT FREQUENCY-SHIFT ANTI-INTERFERENCE AUTONOMOUS COMMUNICATION METHOD BASED ON ELECTROMAGNETIC ENVIRONMENT LEARNING

(71) Applicant: Nanjing University of Posts and Telecommunications, Jiangsu (CN)

(72) Inventors: Yulong Zou, Jiangsu (CN); Yunlong Ma, Jiangsu (CN); Jia Zhu, Jiangsu (CN); Haiyan Guo, Jiangsu (CN); Han Gao, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 118 days.

(21) Appl. No.: 16/483,443

(22) PCT Filed: Oct. 24, 2018

(86) PCT No.: PCT/CN2018/111542
§ 371 (c)(1),
(2) Date: Aug. 4, 2019

(87) PCT Pub. No.: WO2019/223224
PCT Pub. Date: Nov. 28, 2019

(65) Prior Publication Data
US 2021/0076390 A1    Mar. 11, 2021

(30) Foreign Application Priority Data
May 22, 2018 (CN) .......................... 201810496713.X

(51) Int. Cl.
*H04W 72/08* (2009.01)
*H04B 17/336* (2015.01)
(Continued)

(52) U.S. Cl.
CPC ........ *H04W 72/082* (2013.01); *H04B 17/336* (2015.01); *H04B 17/382* (2015.01);
(Continued)

(58) Field of Classification Search
CPC ............... H04W 72/082; H04W 16/14; H04W 72/0453; H04W 28/04; H04B 17/382; H04B 17/336
See application file for complete search history.

(56) References Cited

U.S. PATENT DOCUMENTS

2009/0129273 A1 * 5/2009 Zou .......................... H04L 45/24
370/235
2010/0173586 A1 * 7/2010 McHenry ............ H04L 27/0006
455/62

(Continued)

FOREIGN PATENT DOCUMENTS

CN      103517277    1/2014
CN      105680964    6/2016

OTHER PUBLICATIONS

"International Search Report (Form PCT/ISA/210) of PCT/CN2018/111542," dated Feb. 12, 2019, pp. 1-4.
(Continued)

*Primary Examiner* — Magdi Elhag
(74) *Attorney, Agent, or Firm* — JCIP Global Inc.

(57) ABSTRACT

Disclosed is an intelligent frequency-shift anti-interference autonomous communication method based on electromagnetic environment learning, applied to an intelligent frequency-shift anti-interference autonomous communication system based on electromagnetic environment learning. The method comprises a communication link establishing process and an intelligent frequency-shift anti-interference process in the communication process. In the communication link establishing process, a communication initiator initiates communication to a communication responder, and the
(Continued)

S1: Autonomously establish a communication link by a transmitting node serving as a communication initiator and a receiving node serving as a communication responder within a set spectrum range S2: Realize intelligent frequency-shift anti-interference between the communication initiator and the communication responder through a threshold comparison mechanism and a timeout detection mechanism under the influence of an interference signal of an interference node, so as to achieve smooth communication communication initiator and the communication responder perform frequency point matching, and finally negotiate to establish a communication connection. In the intelligent frequency-shift anti-interference process, interference detection is carried out after the communication initiator and the communication responder establish a link, and a receiving frequency point is sensed, and finally, whether the receiving frequency point and a transmitting frequency point are matched or not is negotiated, so that implementation of intelligent frequency-shift anti-interference is realized.

6 Claims, 3 Drawing Sheets

(51) Int. Cl.
*H04B 17/382* (2015.01)
*H04W 16/14* (2009.01)
*H04W 28/04* (2009.01)
*H04W 72/04* (2009.01)

(52) U.S. Cl.
CPC ........... *H04W 16/14* (2013.01); *H04W 28/04* (2013.01); *H04W 72/0453* (2013.01)

(56) References Cited

U.S. PATENT DOCUMENTS

2017/0215213 A1* 7/2017 Lee .................. H04L 61/20
2017/0332243 A1 11/2017 MacMullan et al.

OTHER PUBLICATIONS

Li Hui, "Research on Spectrum Sensing Technology in Complex Electromagnetic Environment", Department of Engineering, University of Electronic Science and Technology of China, Jun. 2016, pp. 1-80.

* cited by examiner

INTELLIGENT FREQUENCY-SHIFT ANTI-INTERFERENCE AUTONOMOUS COMMUNICATION METHOD BASED ON ELECTROMAGNETIC ENVIRONMENT LEARNING

CROSS-REFERENCE TO RELATED APPLICATION

This application is a 371 of international application of PCT application serial no. PCT/CN2018/111542, filed on Oct. 24, 2018, which claims the priority benefit of China application no. 201810496713.X, filed on May 22, 2018. The entirety of each of the above-mentioned patent applications is hereby incorporated by reference herein and made a part of this specification.

TECHNICAL FIELD

The present invention relates to the field of wireless communication technologies, and mainly relates to spectrum sensing and interference countermeasure technology, in particular to an intelligent frequency-shift anti-interference autonomous communication method based on electromagnetic environment learning.

BACKGROUND

The existing anti-interference communication methods include frequency hopping communication and spread spectrum communication. The premise of frequency hopping communication is that a frequency hopping sequence is required, and communication parties replace a frequency point according to the frequency hopping sequence to achieve the anti-interference purpose. If the frequency hopping sequence is intercepted by an interference node and tracking interference is carried out, the communication is interrupted. The spread spectrum communication transmission also requires that a receiving party and a transmitting party have known a spread spectrum coding sequence, and the anti-interference effect is achieved by adjusting a spread spectrum gain. However, the system occupies more frequency bandwidth and the system implementation complexity also increases when the spread spectrum gain is too large.

In addition, the existing communication system negotiates frequency point information of the receiving party and the transmitting party through a dedicated control channel. The consistency negotiation method of a receiving frequency point and a transmitting frequency point is simple to implement and highly responsive, and both parties can quickly establish a communication link. However, there is a great risk that once the control channel is interfered, the communication is interrupted.

SUMMARY

The main objective of the present invention is to provide an intelligent frequency-shift anti-interference autonomous communication method based on electromagnetic environment learning, so as to solve the deficiencies of the anti-interference communication technology in the prior art. The specific technical solution is as follows:

An intelligent frequency-shift anti-interference autonomous communication method based on electromagnetic environment learning, applied to an intelligent frequency-shift anti-interference autonomous communication system based on electromagnetic environment learning, which consists of a transmitting node, a receiving node, and an interference node, the method comprising a communication link establishing process and an intelligent frequency-shift anti-interference process in the communication process, wherein the communication link establishing process comprises the steps of:

communication initiation: the transmitting node serving as a communication initiator senses a frequency spectrum of a receiving node serving as a communication responder in a [a, b] frequency band range, and selects an idle frequency point in the [a, b] frequency point range according to a sensing result, and transmits a calling signal to the communication responder;

frequency point matching: the communication responder performs a frequency sweep operation in the [a, b] frequency band range, and performs frequency point matching for the communication initiator by checking packet header information; and if the matching is successful, the communication responder obtains an idle frequency point through the frequency sweep again, and transmits a response signal to the communication initiator; and link establishment negotiation: the communication initiator performs spectrum sensing in the [a, b] frequency band range while transmitting the calling signal to the communication responder, and performs frequency point matching for the communication responder by checking packet header information, until link establishment between the communication initiator and the communication responder is completed; and the intelligent frequency-shift anti-interference process comprises the steps of:

interference detection: a threshold value is set, real-time detection is performed on a channel of the communication initiator and the communication responder after a link is established between the communication initiator and the communication responder, and a detected value is compared with the threshold value to determine whether an interference exists;

spectrum sensing: if the intelligent frequency-shift anti-interference autonomous communication system detects the presence of the interference, the intelligent frequency-shift anti-interference autonomous communication system performs a frequency sweep operation on the [a, b] frequency band by using a spectrum sensing algorithm; the communication initiator or the communication responder obtains an idle frequency point from the [a, b] frequency band range through the frequency sweep to update an original receiving frequency point; and the communication initiator and the communication responder notify each other to use the updated receiving frequency point for frequency point matching; and avoidance negotiation: the intelligent frequency-shift anti-interference autonomous communication system checks whether a receiving frequency point or a transmitting frequency point of the communication initiator or the communication responder is the same every time the communication initiator or the communication responder receives a packet; if the receiving frequency point or the transmitting frequency point is different, transmission of the packet is terminated, and the transmitting frequency point is updated to be the received frequency point for a next packet transmission operation.

As a further improvement of the present invention, the intelligent frequency-shift anti-interference autonomous communication method introduces a timeout detection mechanism, that is, in the interference detection process, if the intelligent frequency-shift anti-interference autonomous communication system detects that the interference is a homologous interference, the intelligent frequency-shift anti-interference autonomous communication system does not immediately make a decision that the interference exists, but continuously performs N times of packet reception and legality check; if an illegal packet is found in each check process, a timeout counter value is incremented by 1, and is compared with the threshold value; and if the timeout counter value is less than the threshold value, the reception is continued, otherwise the reception is terminated and a decision that the interference exists is made.

As a further improvement of the present invention, the homologous interference signal refers to a signal having the same modulation mode as a user signal.

As a further improvement of the present invention, the spectrum sensing algorithm comprises full-band sensing and fast-band sensing, and the fast-band sensing is used in the spectrum sensing step to obtain a desired idle frequency point.

As a further improvement of the present invention, the establishment of the communication link is completely autonomous without the need for any dedicated control channel, and the communication initiator and the communication responder negotiate the frequency point of both parties through a consistency negotiation method.

As a further improvement of the present invention, the packet comprises four domains: an initiator ID, a responder ID, a response signal, a frequency hopping point, and a payload, wherein the initiator ID and the responder ID are used for checking of respective identities; the response signal is used as an identifier bit of the operation state of the communication initiator and the communication responder; the frequency hopping point is used for negotiating a frequency point of communication between the communication initiator and the communication responder; and the payload is information to be transmitted by a user.

As a further improvement of the present invention, after detecting the interference, the intelligent frequency-shift anti-interference autonomous communication system obtains an idle frequency point by using the spectrum sensing algorithm; during negotiation of the communication initiator and the communication responder, the idle frequency point is encapsulated into a packet to be transmitted to the other party of communication, rather than through a dedicated control channel, and the other party receives and unpacks the packet to obtain the idle frequency point and then updates the transmitting frequency point, thereby implementing frequency-shift avoidance.

As a further improvement of the present invention, the intelligent frequency-shift anti-interference autonomous communication system performs interference detection through a double decision mechanism of detecting a signal-to-noise ratio of the channel of the communication initiator and the communication responder in real time and introducing the timeout detection mechanism.

In the intelligent frequency-shift anti-interference autonomous communication method based on electromagnetic environment learning of the present invention, an intelligent frequency-shift anti-interference autonomous communication system based on electromagnetic environment learning, which consists of a transmitting node, a receiving node and an interference node, is constructed through a software radio platform USRP and LabVIEW; link communication between two parties is intelligently and autonomously completed by the transmitting node and the receiving node, and a timeout detection mechanism and a threshold comparison mechanism are introduced in the communication process, so that the intelligent frequency-shift anti-interference autonomous communication system based on electromagnetic environment learning can intelligently achieve the intelligent anti-interference communication under the frequency-shift condition in the case that an interference signal for communication is generated by the interference node. Compared with the prior art, the present invention has the following beneficial effects: the establishment of the communication link is completely self-organized without the need for any dedicated control channel; and the double detection mechanism of the threshold decision and the timeout decision is adopted in the interference countermeasure process, which can effectively avoid a heterogeneous interference and a homologous interference, thereby improving the anti-interference performance of the wireless communication system.

DETAILED DESCRIPTION OF THE INVENTION

In order to make those skilled in the art better understand the solutions of the present invention, the technical solutions in embodiments of the present invention are clearly and completely described below with reference to the accompanying drawings in the embodiments of the present invention.

Figure 3:
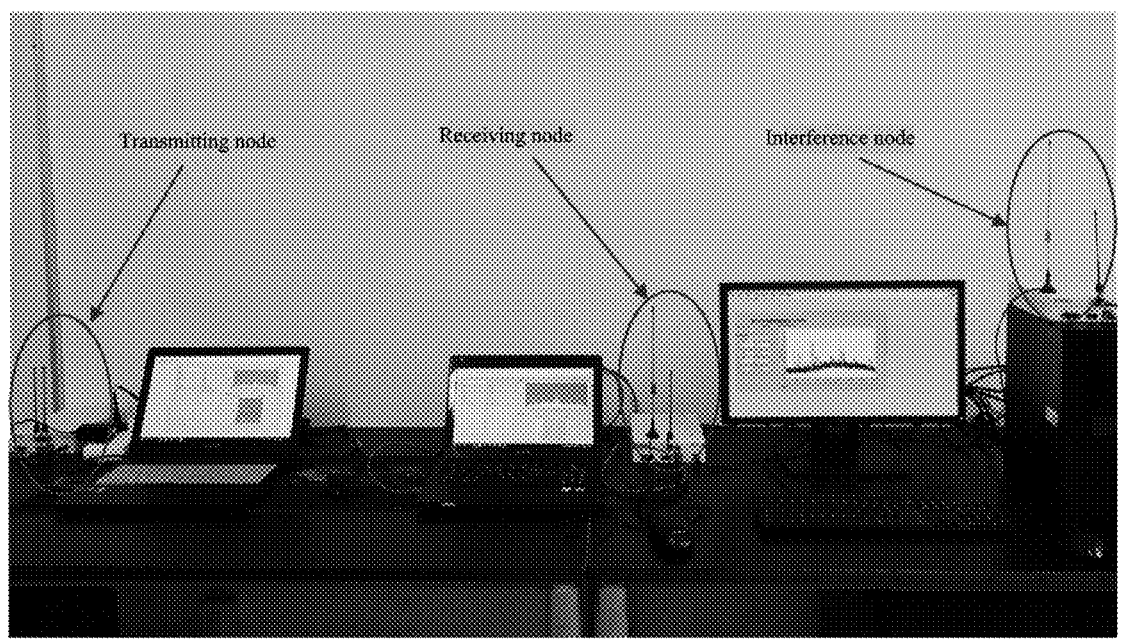
FIG. 3 is a schematic structural diagram of an intelligent frequency-shift anti-interference autonomous communication system based on electromagnetic environment learning according to the present invention.

Referring to FIG. 3, in an embodiment of the present invention, an intelligent frequency-shift anti-interference autonomous communication system based on electromagnetic environment learning is constructed through a software radio platform USRP and LabVIEW. The system mainly consists of three parts: a transmitting node, a receiving node, and an interference node, wherein the transmitting node simulates a communication initiator, the receiving node simulates a communication responder, and the interference node simulates an interference source.

Figure 1:
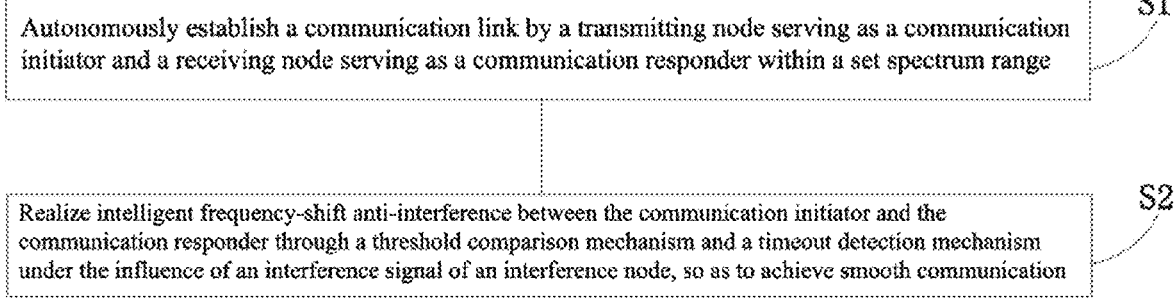
FIG. 1 is a schematic flowchart of an intelligent frequency-shift anti-interference autonomous communication method based on electromagnetic environment learning according to the present invention.
Figure 2:
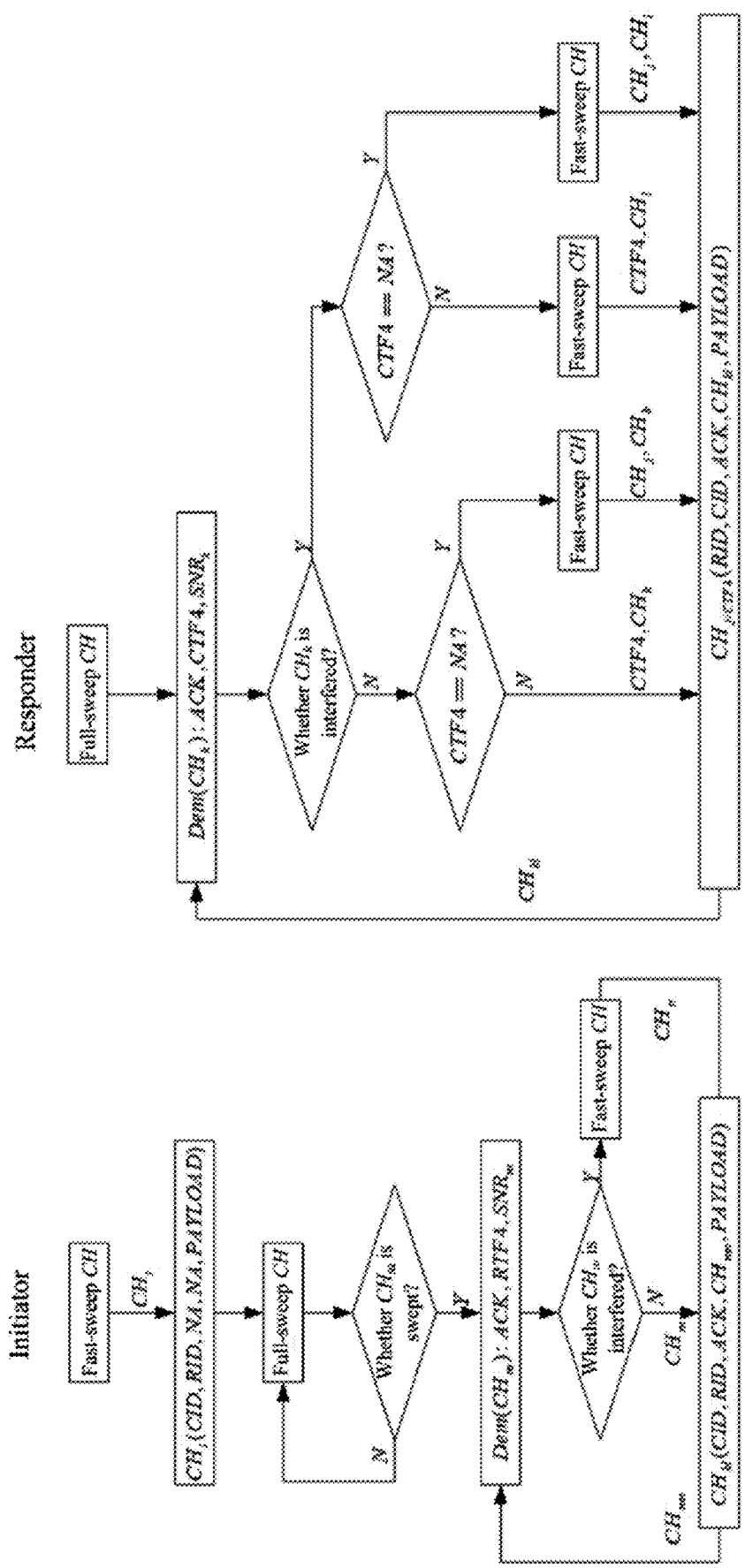
FIG. 2 is a schematic flowchart showing specific communication of a communication initiator and a communication responder according to the present invention.

Referring to FIGS. 1 and 2, in an embodiment of the present invention, provided is an intelligent frequency-shift anti-interference autonomous communication method based on electromagnetic environment learning, applied to the foregoing intelligent frequency-shift anti-interference autonomous communication system based on electromagnetic environment learning, the method comprising the following steps:

S1: a communication link is autonomously established by a transmitting node serving as a communication initiator and a receiving node serving as a communication responder within a set spectrum range. The specific description is as follows:

communication initiation: a transmitting node serving as a communication initiator senses a frequency spectrum of a receiving node serving as a communication responder in a [a, b] frequency band range, and selects an idle frequency point in the [a, b] frequency point range according to a sensing result, and transmits a calling signal to the communication responder;

frequency point matching: the communication responder performs a frequency sweep operation in the [a, b] frequency band range, and performs frequency point matching for the communication initiator by checking packet header information; and if the matching is successful, the communication responder obtains an idle frequency point through the frequency sweep again, and transmits a response signal to the communication initiator; and link establishment negotiation: the communication initiator performs spectrum sensing in the [a, b] frequency band range while transmitting the calling signal to the communication responder, and performs frequency point matching for the communication responder by checking packet header information, until link establishment between the communication initiator and the communication responder is completed. Preferably, the spectrum sensing adopted in the present invention obtains the idle frequency points in the desired [a, b] frequency band range through fast-band sensing in the spectrum sensing algorithm.

In the embodiment, the establishment of the communication link is completely autonomous without the need for a dedicated control channel, and the communication initiator and the communication responder negotiate the frequency point of both parties through a consistency negotiation method.

S2: under the influence of an interference signal from an interference node, the intelligent frequency-shift anti-interference is realized between the communication initiator and the communication responder through a threshold comparison mechanism and a timeout detection mechanism, thereby achieving smooth communication. The specific description is as follows:

interference detection: a threshold value is set, real-time detection is performed on a channel of the communication initiator and the communication responder after a link is established between the communication initiator and the communication responder, and a detected value is compared with the threshold value to determine whether an interference exists, wherein in the present invention, a method of determining whether an interference exists through a comparison result of the set threshold value and the signal-to-noise ratio detected in real time is called a threshold comparison mechanism;

spectrum sensing: if the intelligent frequency-shift anti-interference autonomous communication system detects the presence of the interference, the intelligent frequency-shift anti-interference autonomous communication system performs a frequency sweep operation on the [a, b] frequency band by using a spectrum sensing algorithm; the communication initiator or the communication responder obtains an idle frequency point from the [a, b] frequency band range through the frequency sweep to update an original receiving frequency point; and the communication initiator and the communication responder notify each other to use the updated receiving frequency point for frequency point matching; and avoidance negotiation: the intelligent frequency-shift anti-interference autonomous communication system checks whether a receiving frequency point or a transmitting frequency point of the communication initiator or the communication responder is the same every time the communication initiator or the communication responder receives a packet; if the receiving frequency point or the transmitting frequency point is different, transmission of the packet is terminated, and the transmitting frequency point is updated to be the received frequency point for a next packet transmission operation.

In the embodiment of the present invention, after detecting the interference, the intelligent frequency-shift anti-interference autonomous communication system obtains an idle frequency point by using the spectrum sensing algorithm; during negotiation of the communication initiator and the communication responder, the idle frequency point is encapsulated into a packet to be transmitted to the other party of communication, rather than through a dedicated control channel, and the other party receives and unpacks the packet to obtain the idle frequency point and then updates the transmitting frequency point, thereby implementing frequency-shift avoidance.

In the avoidance negotiation process, the packet sent by communication between the communication initiator and the communication responder comprises four domains: an initiator ID, a responder ID, a response signal, a frequency hopping point, and a payload, wherein the initiator ID and the responder ID are used for checking of respective identities; the response signal is used as an identifier bit of the operation state of the communication initiator and the communication responder; the frequency hopping point is used for negotiating a frequency point of communication between the communication initiator and the communication responder; and the payload is information to be transmitted by a user.

Further, the intelligent frequency-shift anti-interference autonomous communication method introduces a timeout detection mechanism, that is, in the interference detection process, if the intelligent frequency-shift anti-interference autonomous communication system detects that the interference is a homologous interference, the intelligent frequency-shift anti-interference autonomous communication system does not immediately make a decision that the interference exists, but continuously performs N times of packet reception and legality check; if an illegal packet is found in each check process, a timeout counter value is incremented by 1, and is compared with the threshold value; and if the timeout counter value is less than the threshold value, the reception is continued, otherwise the reception is terminated and a decision that the interference exists is made. That is, the present invention detects whether an interference exists in the intelligent frequency-shift anti-interference autonomous communication system through the combination of the timeout detection mechanism and the threshold comparison mechanism.

The homologous interference signal refers to a signal having the same modulation mode as a user signal.

In the present invention, the used spectrum sensing algorithm may be full-band sensing or fast-band sensing. The fast spectrum sensing means that sensing is terminated once a first idle frequency point that satisfies the requirement is obtained in the [a, b] frequency band range. This method can effectively shorten the time for establishing the communication link. The full-band sensing means that spectrum sensing is performed on the frequency points in the [a, b] range one by one, and the optimal idle frequency point is obtained according to own requirements. The use of the fast spectrum sensing or the full-band sensing in the spectrum sensing process is not limited and not fixed in the present invention, and can be determined according to actual conditions.

In the intelligent frequency-shift anti-interference autonomous communication method based on electromagnetic environment learning of the present invention, an intelligent frequency-shift anti-interference autonomous communication system based on electromagnetic environment learning, which consists of a transmitting node, a receiving node and an interference node, is constructed through a software radio platform USRP and LabVIEW; link communication between two parties is intelligently and autonomously completed by the transmitting node and the receiving node, and a timeout detection mechanism and a threshold comparison mechanism are introduced in the communication process, so that the intelligent frequency-shift anti-interference autonomous communication system based on electromagnetic environment learning can intelligently achieve the intelligent anti-interference communication under the frequency-shift condition in the case that an interference signal for communication is generated by the interference node. Compared with the prior art, the present invention has the following beneficial effects: the establishment of the communication link is completely self-organized without the need for any dedicated control channel; and the double detection mechanism of the threshold decision and the timeout decision is adopted in the interference countermeasure process, which can effectively avoid a heterogeneous interference and a homologous interference, thereby improving the anti-interference performance of the wireless communication system.

In view of the above, the present invention utilizes two spectrum sensing algorithms and packet encapsulation techniques to realize autonomous communication link establishment and intelligent frequency-shift anti-interference of the intelligent frequency-shift anti-interference autonomous communication system based on electromagnetic environment learning. Compared with the conventional communication frequency point negotiation method, the intelligent frequency-shift anti-interference autonomous communication method of the present invention improves the anti-interference performance of the communication system.

The above is only the preferred embodiments of the present invention, and not intended to limit the scope of the present invention. Although the present invention has been described in detail with reference to the foregoing embodiments, those skilled in the art can still make modifications on the technical solutions described in the foregoing specific implementations, or make equivalent replacements on some of the technical features therein. The equivalent structures made from the description and the drawings of the present invention, when directly or indirectly applied to other related technical fields, all fall within the scope of the present invention.

What is claimed is:

1. An intelligent frequency-shift anti-interference autonomous communication method based on electromagnetic environment learning, applied to an intelligent frequency-shift anti-interference autonomous communication system based on electromagnetic environment learning comprising a transmitting node, a receiving node, and an interference node, wherein the method comprising a communication link establishing process and an intelligent frequency-shift anti-interference process in the communication process, wherein the communication link establishing process comprises the steps of:

communication initiation: the transmitting node serving as a communication initiator senses a frequency spectrum of a receiving node serving as a communication responder in a frequency band, and selects an idle frequency point in the frequency band according to a sensing result, and transmits a beacon signal to the communication responder, wherein the communication initiator sends a packet to the communication responder;

frequency point matching: the communication responder performs a frequency sweep in the frequency band, and performs frequency point matching for the communication initiator by checking packet header information of the packet; and if the matching is successful, the communication responder obtains an idle frequency point through the frequency sweep again, and transmits a response signal to the communication initiator; and link establishment negotiation: the communication initiator performs spectrum sensing in the frequency band while transmitting the beacon signal to the communication responder, and performs frequency point matching for the communication responder by checking packet header information of the packet, until link establishment between the communication initiator and the communication responder is completed; and the intelligent frequency-shift anti-interference process comprises the steps of:

interference detection: a threshold value is set, real-time detection is performed on a channel of the communication initiator and the communication responder after a link is established between the communication initiator and the communication responder, and the communication initiator compares a detected value with the threshold value to determine whether an interference exists, wherein the detected value comprising a signal-to-noise ratio;

spectrum sensing: if the intelligent frequency-shift anti-interference autonomous communication system detects the presence of the interference, the intelligent frequency-shift anti-interference autonomous communication system performs a frequency sweep on the frequency band by using a spectrum sensing algorithm; the communication initiator or the communication responder obtains an idle frequency point from the frequency band through the frequency sweep to update an original receiving frequency point; and the communication initiator and the communication responder notify each other to use the updated receiving frequency point for frequency point matching; and avoidance negotiation: the intelligent frequency-shift anti-interference autonomous communication system checks whether a receiving frequency point or a transmitting frequency point of the communication initiator or the communication responder is the same every time the communication initiator or the communication responder receives the packet; if the receiving frequency point or the transmitting frequency point is different, transmission of the packet is terminated, and the transmitting frequency point is updated to be the received frequency point for a next packet transmission operation, wherein the intelligent frequency-shift anti-interference autonomous communication method introduces a timeout detection mechanism, in the interference detection process, if the intelligent frequency-shift anti-interference autonomous communication system detects that the interference is a homologous interference, the intelligent frequency-shift anti-interference autonomous communication system does not immediately make a decision that the interference exists, but continuously performs N times of packet reception and legality check; if an illegal packet is found in each check process, a timeout counter value is incremented by 1, and is compared with the threshold value; and if the timeout counter value is less than the threshold value, the reception is continued, otherwise the reception is terminated and a decision that the interference exists is made, wherein the homologous interference refers to a signal having the same modulation mode as the response signal.

2. The intelligent frequency-shift anti-interference autonomous communication method based on electromagnetic environment learning according to claim 1, wherein the spectrum sensing algorithm comprises full-band sensing and fast-band sensing, and the fast-band sensing is used in the spectrum sensing step to obtain a desired idle frequency point.

3. The intelligent frequency-shift anti-interference autonomous communication method based on electromagnetic environment learning according to claim 1, wherein the establishment of the communication link is completely autonomous without the need for any dedicated control channel, and the communication initiator and the communication responder negotiate the frequency point of both parties through a consistency negotiation method.

4. The intelligent frequency-shift anti-interference autonomous communication method based on electromagnetic environment learning according to claim 1, wherein the packet comprises four domains: an initiator ID, a responder ID, a response signal, a frequency hopping point, and a payload, wherein the initiator ID and the responder ID are used for checking of respective identities; the response signal is used as an identifier bit of the operation state of the communication initiator and the communication responder; the frequency hopping point is used for negotiating a frequency point of communication between the communication initiator and the communication responder; and the payload is information to be transmitted by a user.

5. The intelligent frequency-shift anti-interference autonomous communication method based on electromagnetic environment learning according to claim 1, wherein after detecting the interference, the intelligent frequency-shift anti-interference autonomous communication system obtains an idle frequency point by using the spectrum sensing algorithm; during negotiation of the communication initiator and the communication responder, the idle frequency point is encapsulated into a packet to be transmitted to the other party of communication, rather than through a dedicated control channel, and the other party receives and unpacks the packet to obtain the idle frequency point and then updates the transmitting frequency point, thereby implementing frequency-shift avoidance.

6. The intelligent frequency-shift anti-interference autonomous communication method based on electromagnetic environment learning according to claim 1, wherein the intelligent frequency-shift anti-interference autonomous communication system performs interference detection through a double decision mechanism of detecting a signal-to-noise ratio of a channel of the communication initiator and the communication responder in real time and introducing the timeout detection mechanism.

* * * * *